US009757598B2

(12) United States Patent
Codega et al.

(10) Patent No.: US 9,757,598 B2
(45) Date of Patent: Sep. 12, 2017

(54) VENTRAL LOCKING DEVICE

(71) Applicant: Camp S.p.A., Lecco (IT)

(72) Inventors: Antonio Codega, Lecco (IT); Matteo Rivadossi, Lecco (IT)

(73) Assignee: CAMP S.P.A., Lecco (IT)

( * ) Notice: Subject to any disclaimer, the term of this patent is extended or adjusted under 35 U.S.C. 154(b) by 308 days.

(21) Appl. No.: 13/851,604

(22) Filed: Mar. 27, 2013

(65) Prior Publication Data

US 2013/0256061 A1 Oct. 3, 2013

(30) Foreign Application Priority Data

Mar. 27, 2012 (IT) .............................. MI2012A0483

(51) Int. Cl.
| A62B 35/00 | (2006.01) |
| A62B 1/14 | (2006.01) |
| B61H 9/02 | (2006.01) |
| F16D 63/00 | (2006.01) |
| A63B 29/02 | (2006.01) |

(52) U.S. Cl.
CPC ............ *A62B 35/0081* (2013.01); *A62B 1/14* (2013.01); *B61H 9/02* (2013.01); *F16D 63/008* (2013.01); *A63B 29/02* (2013.01)

(58) Field of Classification Search
CPC ........ A62B 35/0081; A62B 1/14; B61H 9/02; F16D 63/008; A63B 29/02
USPC .......................................... 182/5–7, 191–192
See application file for complete search history.

(56) References Cited

U.S. PATENT DOCUMENTS

| 1,123,229 | A | * | 1/1915 | Booth | .......................... | 182/193 |
| RE28,273 | E | * | 12/1974 | Brda | .................................. | 182/6 |
| 3,876,036 | A | * | 4/1975 | Sweet | ............................. | 182/18 |
| 4,923,037 | A | * | 5/1990 | Stephenson | ............ | A62B 35/04 188/188 |
| 5,400,869 | A | * | 3/1995 | Rocourt | ........................ | 182/133 |
| 5,664,640 | A | * | 9/1997 | Smith | ....................... | A62B 1/14 182/193 |

(Continued)

FOREIGN PATENT DOCUMENTS

| GB | 2293193 A | 3/1996 |
| WO | WO2006115468 A1 | 11/2006 |

OTHER PUBLICATIONS

Search Report for Italian Application No. MI2012A000483 dated Nov. 16, 2012.

*Primary Examiner* — Katherine Mitchell
*Assistant Examiner* — Sherif Mekhaeil
(74) *Attorney, Agent, or Firm* — Meunier Carlin & Curfman LLC

(57) ABSTRACT

A self-locking device for a mountaineer or a speleologist climbing up a rope is provided herein. The device includes a main body having an inner face with a sliding seat for the rope. The sliding seat is partially defined by a part of the body of the device folded upon itself and partially defined at a bottom and laterally by the inner face of the body of the device. The device includes a cam member associated with the body and able to tilt around an axis X from an open position to a position holding the rope. The self-locking device also includes one or more pulleys associated with the body. The one or more pulleys are arranged so that a longitudinal axis Z lies on a plane parallel to a plane a of major extension of the body and perpendicular to a sliding direction of the rope.

11 Claims, 5 Drawing Sheets

(56) References Cited

U.S. PATENT DOCUMENTS

| | | | | |
|---|---|---|---|---|
| 6,019,195 | A * | 2/2000 | Pelofi | A62B 1/14 182/192 |
| 6,029,777 | A * | 2/2000 | Rogelja | A62B 1/14 182/192 |
| 8,733,504 | B2 * | 5/2014 | Mauthner | A62B 1/14 182/191 |
| 9,016,431 | B2 * | 4/2015 | Barnett | A62B 1/14 182/5 |
| 2006/0207829 | A1 * | 9/2006 | Mauthner | A62B 1/14 182/5 |
| 2008/0164096 | A1 * | 7/2008 | Rogelja | A63B 29/02 182/5 |
| 2009/0120720 | A1 * | 5/2009 | Arms | A62B 1/14 182/193 |
| 2010/0200333 | A1 * | 8/2010 | Maurice et al. | 182/133 |
| 2013/0032433 | A1 * | 2/2013 | Codega | 182/5 |

\* cited by examiner

VENTRAL LOCKING DEVICE

CROSS-REFERENCE TO RELATED APPLICATIONS

This application claims the benefit of Italian Patent Application No. MI2012A000483, filed on Mar. 27, 2012, the disclosure of which is expressly incorporated herein by reference in its entirety.

The present invention is directed to a self-locking device for a mountaineer or a speleologist climbing up a rope.

Actually, such devices were born for speleology, while being effectively used also in mountaineering activities. Devices for climbing up a rope are already known and generally comprise a structure or main body comprising a housing capable of at least partially receiving a rope, so as to allow the sliding thereof, and a lever member that, by acting on the rope itself, holds it thereby locking the downward descent.

In particular, the movement during the climbing progression up a rope provides for the alternation of pushing and suspension movements (the so-called "frog" movement).

In the first movement, the user typically lifts a graspable locking device of the handle type by pushing it upwardly while simultaneously bringing his/her knees to the chest. Subsequently, he/she lifts on the bracket connected with the handle, and he/she pushes him/herself upwardly, thereby bringing the ventral locking device to a higher position. This is made possible by the fact that the cam member of the device allows sliding along the rope.

Subsequently, the user hangs to the ventral locking device, thus being able to lift the handle again in order to lift again on the bracket and to continue in this manner his/her progression.

However, an important limitation of the known devices is due to the presence of corners and edges in contact with the rope, as illustrated, for example, in FIG. 1A. In this configuration, the continuous sliding of the rope slowly wears the edge itself, causing a progressive thinning thereof. In particular, the wear is higher in the upper part (upstream, where the rope enters) due to the angle formed between the ventral locking device and the handle; if the auxiliary feet locking device is also employed, in addition to these, the angle between the latter and the ventral locking device is still more pronounced, as the friction will be also in the lower portion (downstream) of the device. Such a phenomenon, in particular, can be quicker due to the mud, dust, and dirt that build-up on the rope and/or the device, which naturally occur in the mountain environment, and especially inside caves.

In practice, due to the repeated use, the edge gets thinner and thinner, until it almost becomes a sharp blade. These are certainly dangerous conditions, since the rope sheath is torn and also the interior part thereof can be dangerously and progressively damaged. Furthermore, in the case of a fall (but also only with a disadvantageous angulation), even a clean cut of the rope could occur.

A dangerous situation when using the ventral locking device is represented by the oblique climbing of rope lengths, for example during pendulum movements or in particularly stretched intermediate anchorings (see FIG. 1C).

Such a situation gives rise to contingent risks, since it is possible that, during climbing, the rope tension confers an abnormal inclination to the device, so that the rope may escape from the seat and disengage from the climbing device.

BRIEF SUMMARY OF THE INVENTION

The above-mentioned problems are at least partially solved by a device as defined in the appended claims, the definitions of which are an integral part of the present description. The present invention is directed to a self-locking device for a mountaineer or speleologist climbing up a rope. The device includes a main body with an inner face with a sliding seat for the rope, as well as a cam member associated with the body and able to tilt around an axis X from an open position to a position holding the rope. The device further includes one or more pulleys associated with the body.

In order to better understand the invention and to appreciate the advantages thereof, an embodiment will be described herein below, with reference to the appended Figures.

BRIEF DESCRIPTION OF THE SEVERAL VIEWS OF THE DRAWINGS

FIG. 1B shows the use of a ventral locking device, while

DETAILED DESCRIPTION OF THE INVENTION

Figure 1A:
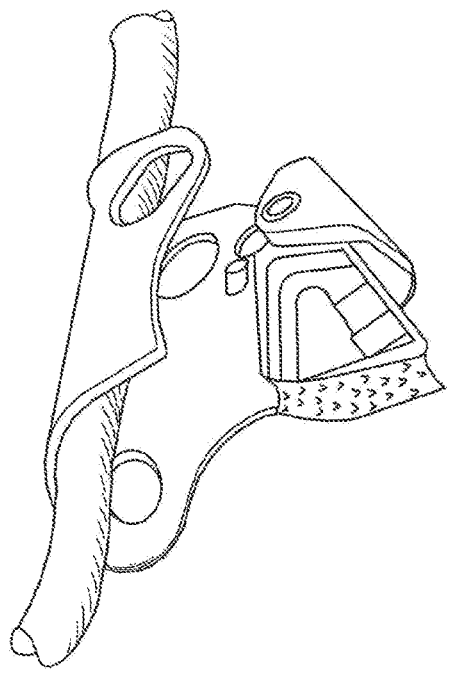
FIG. 1A shows the detail referred to the presence of edges in contact with the rope in the prior art devices.
Figure 1B:
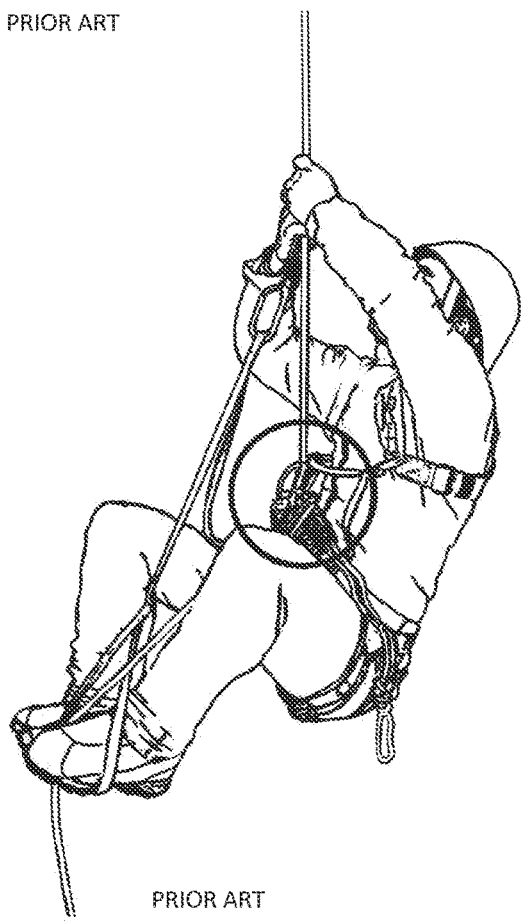
Figure 1C:
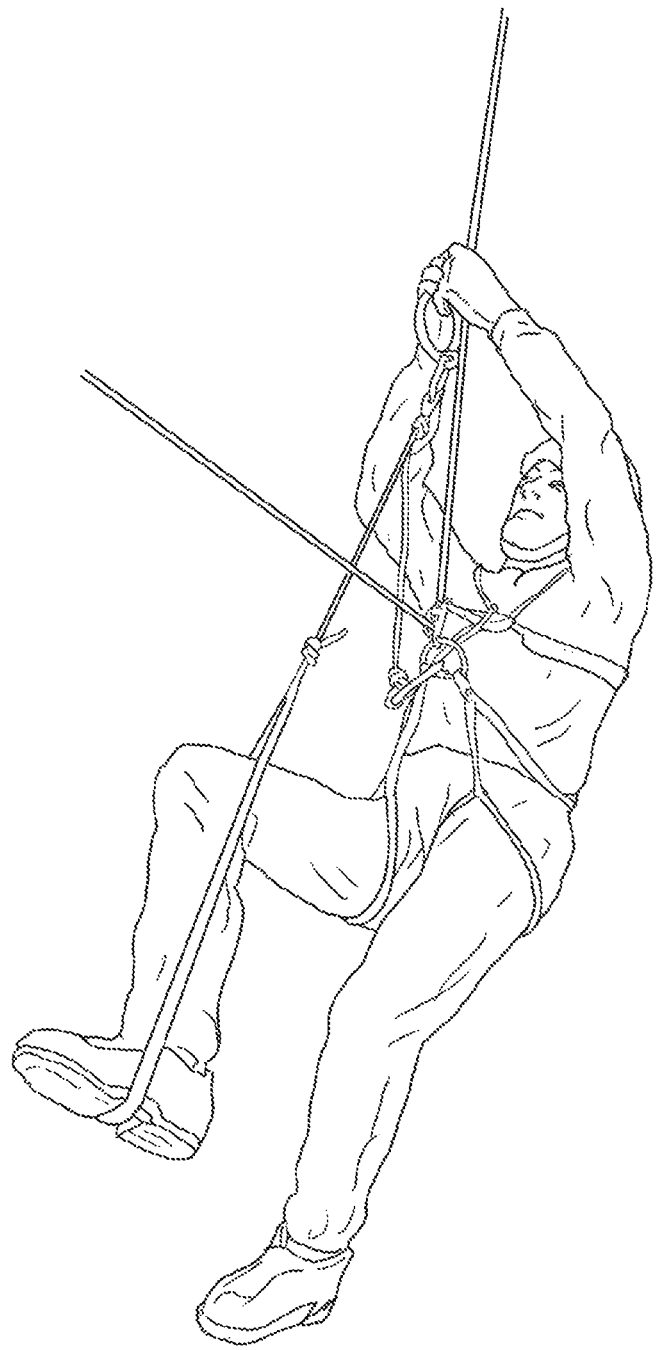
FIG. 1C shows the challenging situation of a typical pendulum movement.

With reference to the Figures, a device according to the invention for climbing up a rope is generally indicated with 1.

In particular, such a device 1 comprises a main body 3 having an inner face 3b which defines at least partially a sliding seat 4 for a rope 2.

More in detail, such a sliding seat 4 is at least defined at the bottom and/or laterally by the body 3 of the folded device.

A cam member 5 is further associated by a holding member 7 on the inner face 3b of the body.

Figure 4A:
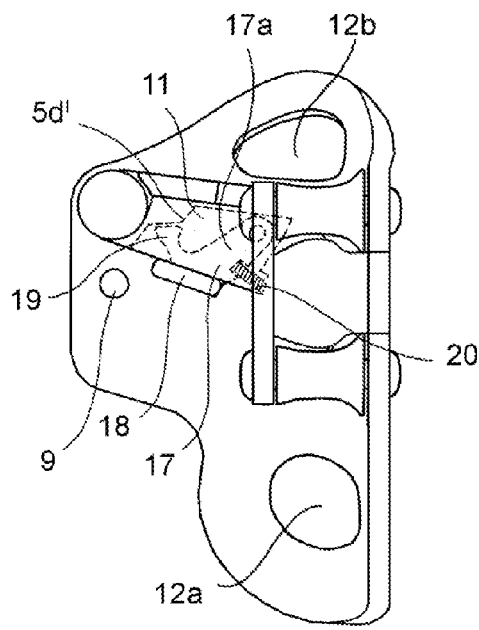
FIGS. 4A and 4B show the device in the closed position and with the cam in the abutment position, respectively.
Figure 4B:
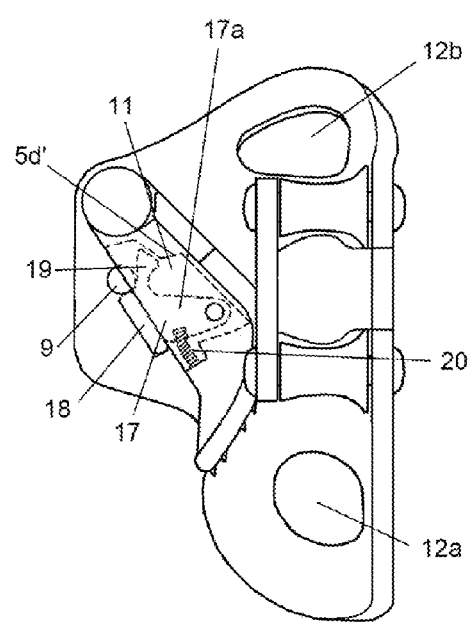

In particular, said cam member 5 is capable of rotating around an axis A, and it is able to tilt from an opening position (shown for example in FIG. 5B) to an operative rope holding position (shown for example in FIG. 4B). To this aim, the holding member 7 comprises a pin 7a intended to insert in a loop 30, obtained at an end of the cam member 5, and in a corresponding hole 31 in the main body 3, so as to form a hinge.

Figure 3:
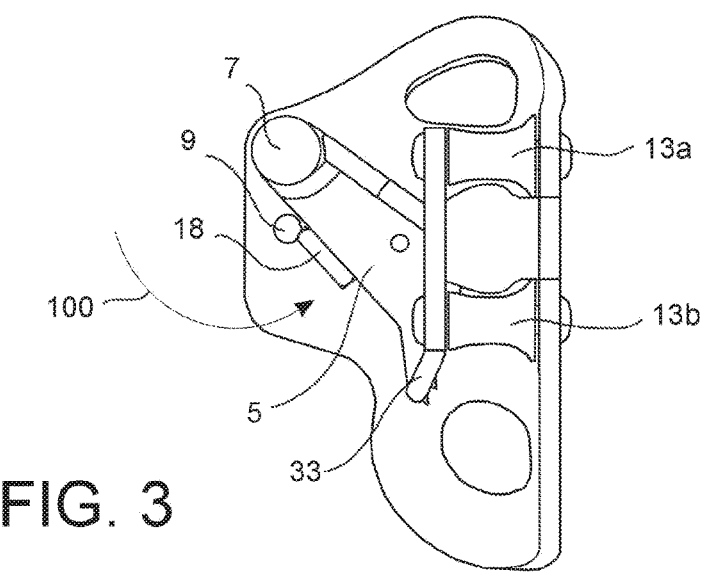
FIG. 3 is a top view of the device of the invention.

According to a preferred aspect, elastic means 6 associated with the cam member 5 can be provided for the elastic return thereof from the opening position to the closure position according to the direction of the arrow 100 in FIG. 3.

Figure 2:
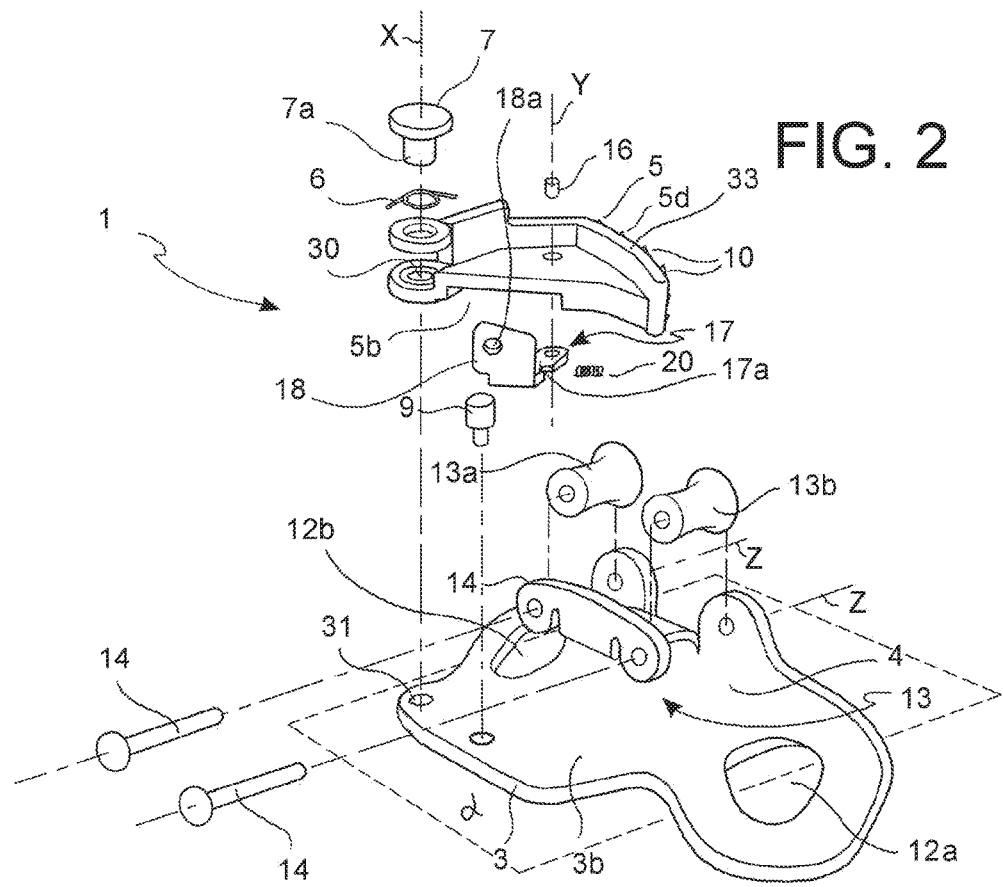
FIG. 2 shows an exploded view of the device of the invention.

Such elastic means 6 can be represented for example by a torsion spring, as shown in FIG. 2.

In more detail, the cam member 5 has a shape comprising a substantially semi-circular portion with a convex profile 5d, which can comprise a friction surface 33 of the cam member 5 with the rope 2.

In accordance with a preferred aspect of the invention, such a friction surface comprises auxiliary elements for holding the rope 10, represented for example by folds.

Advantageously, according to the invention, sliding means of the rope are provided, performing the double function of co-adjuvating the containment of said rope 2 inside the seat 4, and of minimizing the friction during the sliding.

In one embodiment, said sliding means 13 comprise one or more pulleys 13a, 13b, which are rotatably associated with the main body 3 of the device by connection means 14 represented, for example, by pins.

Figure 6:
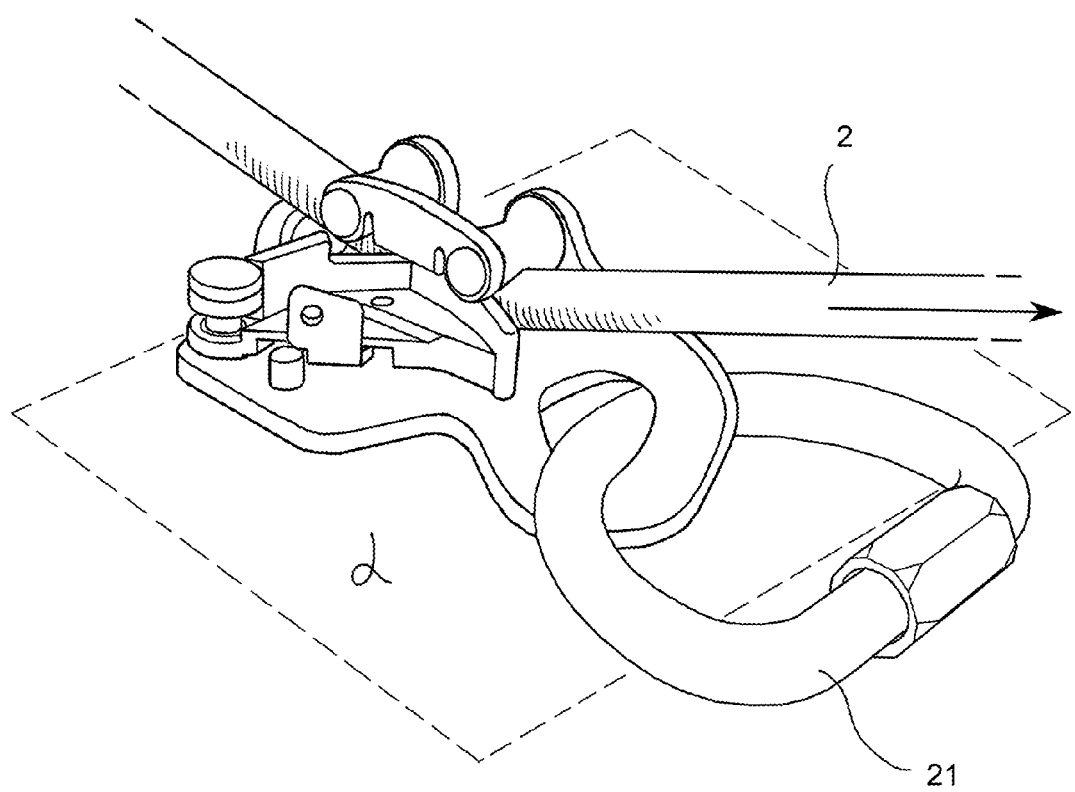
FIG. 6 shows the device in the operative condition.

In particular, such pulleys 13a, 13b, are arranged with the longitudinal axis C lying on a plane parallel to the plane a of a major extension of the body 3 of the device and which is perpendicular to the sliding direction of the rope 2 (see FIG. 6).

In the present description, reference is made to the embodiment in which multiple pulleys are provided, in particular two pulleys; however, the embodiment in which a single pulley or a number of pulleys of more than two is provided is intended as similarly possible.

In such a case, the pulleys will be arranged so that their longitudinal axes C are parallel to one another.

As above mentioned, advantageously, said pulleys 13a, 13b promote the sliding of the rope in the seat 4, thus promoting the climbing operations of the mountaineer or the speleologist.

Furthermore, still more advantageously, the pulleys 13a, 13b may help the rope to avoid sliding on potentially sharp profiles or edges.

According to an embodiment, said pulleys 13a, 13b have a concave (or saddle-shaped) profile partially receiving the rope section.

In one preferred aspect, such a profile is not symmetrical, but has a more pronounced flaring in the portion facing outwardly, i.e., opposite to the position of the cam member 5, as shown in FIG. 3. Hence, the rope 2 is held even more inside the sliding seat 4.

The sliding seat 4 therefore is delimited:
to the bottom and/or laterally, at least partially, by a portion of the inner face 3b of the device 3, which is folded upon itself;
to the top, at least partially, by pulleys 13a, 13b (as represented in FIG. 2);
when the device is in the holding position of the rope, laterally, at least partially by the cam member 5.

According to a preferred embodiment of the invention, a mechanism allowing for the complete opening of the cam member 5 and the locking thereof in the opening position (shown in FIG. 5B) is provided.

In this manner, the insertion of the rope in the seat 4 of the device is made easier.

To this aim, the cam member 5 can be associated with a fastening element 17 capable of fastening the stopping means 9.

More particularly, said fastening element 17 comprises a fastening portion 17a and a stop portion 18 substantially perpendicular to said fastening portion 17a and intended to abut against the corner of the cam member 5.

Such a fastening portion 17a is hinged, at an end, to the cam member 5 through a pin 16, while the opposite end terminates, instead, with a hooked portion 19 configured to be able to cooperate with or to be able to fasten the stopping means 9.

According to a preferred aspect, the fastening element is at least partially housed in a seat 11 obtained in the lower face 5b of the cam member 5 (therefore, facing the inner face 3b of the device body) and defined by a step profile 5d' against which said fastening element 17 abuts.

Figure 5A:
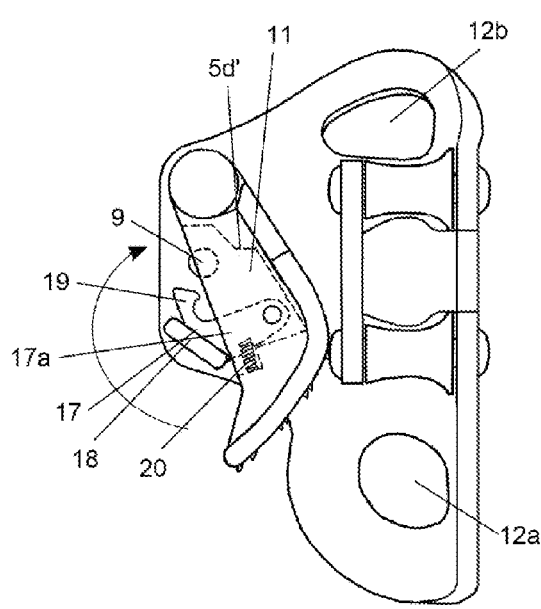
FIGS. 5A and 5B show the device with the fastening element in the open position and the device in the opening position, respectively.
Figure 5B:
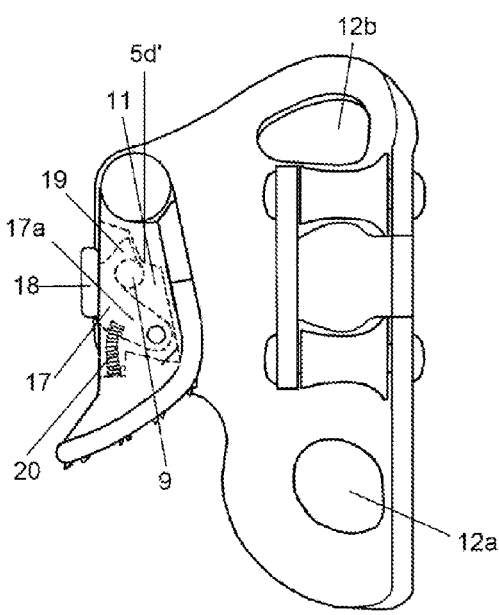

As shown in FIG. 5A, the fastening element 17 can rotate according to the arrow around an axis B passing through the pin 16, and it can take a closure position—in which the stop portion 18 abuts against the corner of the cam member 5—and an opening position opposing to the elastic means 20. To this aim, the elastic means 20 are housed in respective recesses that are present on the fastening element 17 and on the seat 11 of the cam member 5, respectively. Such elastic means 20 tend to keep the fastening element 17 in a non-operative position, as shown in FIG. 4A or 4B.

Therefore, in order to pass from the non-operative position to the operative position, it is necessary to tilt the fastening element 17 in the opposite direction with respect to that indicated by the arrow in FIG. 5A. This can be obtained, for example, by acting on the stop portion 18 directly with one's fingers, or by auxiliary opening members, for example represented by a little rope (not shown in the Figures) that can be constrained to a through-hole 18a.

Once the fastening element 17 has been so opened, the cam member 5 can be rotated in the direction indicated by the arrow in FIG. 5A, and it can be locked by fastening the hooked portion 19 of the fastening element 17 to the stopping means 9.

In such an open configuration, the rope can be easily inserted into the seat 4.

In a particular embodiment, it can be provided that the stop portion 18 of the fastening element 17 is so shaped as to not abut against the member 9; therefore, in such a configuration, the opening rotation of the cam member 5 is allowed to the extent where the profile 5d' of the seat 11 abuts against the stopping means 9.

Advantageously, therefore, the stopping means 9 perform the double function of locking the complete opening of the cam member 5, by abutting against the corner 5d', or to keep the cam member 5 completely open by virtue of the constrain to the hooked portion 19.

Furthermore, in order to allow the use of the device 1, means for the connection with the user's harness can be provided.

Preferably, such means are provided at the ends of the device.

It shall be noticed that, for speleological activities, the harness typically comprises a lower part to which the two leg loops are connected, and an upper part represented by dorsal braces connecting anteriorly.

Therefore, for the connection with the harness, the body 3 of the device comprises a through-hole 12a inside which a ferrule carabiner 21, or any other fastening harness or connector, is inserted, which is in turn connected to the harness (or to the lower part of a harness for speleology).

According to a preferred aspect, the device also comprises a through-hole 12b for the connection thereof with the harness upper (top) portion so as to stretch it and keep it parallel to the rope, thus allowing the sliding thereof.

Preferably, the holes are flared, so that, once the ventral locking device has been connected, it arranges as parallel and adherent to the user's body as possible.

With regards to the use of the device, when the mountaineer or the speleologist begins to go up a rope, it is necessary that the cam member is first open first to allow the insertion of the rope in the sliding seat.

As described before, this is easily obtained by virtue of the possibility to fasten the cam member 5 to the stopping means 9. Subsequently, the device is connected with the harness, for example by a carabiner, or any other fastening harness or connector, passing through the hole.

From the description set forth above of the device for a mountaineer or a speleologist climbing according to the present invention, the advantages that have been made compared to the already known device shall be apparent.

First, the device can be used not only in the mountaineering or speleological field, but also for all those so-called "high-altitude" activities, such as, for example in the industrial field, for repair or maintenance operations.

Furthermore, by virtue of the presence of the members holding the rope in place, the escape of the rope from the device is made still more difficult, or even impossible, thus contributing to a greater safety of the progression activity.

Still more advantageously, the device of the invention may allow avoidance of contact between the rope and metal profiles or edges that may cause thinning due to wear, and may cause the progressive tearing of the rope.

To the above-described embodiments of the device of the invention, those skilled in the art, in order to meet contingent, specific needs, will be able to make a number of adaptations, modifications, and replacements of elements with other functionally equivalent ones, without departing from the scope of the claims set forth below. incorporated herein by reference in its entirety.

The invention claimed is:

1. A self-locking device for a mountaineer or speleologist climbing up a rope, said self-locking device comprising:
 a main body having an inner face comprising a sliding seat for said rope, said sliding seat being at least partially defined by a part of the body of the device folded upon itself and at least partially defined at a bottom and laterally by the inner face of the body of the device;
 a cam member associated with said body and able to rotate around a cam rotational axis (A) from an open position to a position holding said rope;
 at least one pulley associated with said body, wherein the at least one pulley has a concave profile which defines a top of said sliding seat for the rope, and wherein a pulley rotational axis (C) of the at least one pulley lies on a plane perpendicular to the cam rotational axis (A) and wherein the the pulley rotational axis (C) is perpendicular to a sliding direction of the rope.

2. The self-locking device according to claim 1, wherein said cam member comprises a friction surface comprising folds configured to hold the rope.

3. The self-locking device according to claim 1, wherein said pulley has a concave profile that is substantially symmetrical or has a more pronounced flaring in an opposite outer profile portion with respect to a position of the cam member.

4. The self-locking device according to claim 1, wherein two or more pulleys of said at least one pulley have a respective pulley rotational axis (C); said respective pulley rotational axes are parallel to one another.

5. The self-locking device according to claim 1, further comprising a stopping element, wherein the stopping element is configured to prevent the cam member from opening.

6. The self-locking device according to claim 5, wherein said cam member further comprises a fastening element configured to fasten to the stopping element, wherein the fastening element is capable of maintaining the cam member in the open position.

7. The self-locking device according to claim 6, wherein said fastening element is at least partially housed in a seat of said cam member.

8. The self-locking device according to claim 7, wherein said fastening element comprises a stop portion capable of opening the cam member.

9. The self-locking device according to claim 8, wherein the stop portion comprises a through-hole.

10. The self-locking device according claim 6, wherein said fastening element further comprises a hooked portion configured to fasten to said stopping element.

11. The self-locking device according to claim 1, further comprising a connector configured to connect the self-locking device to a harness.

* * * * *